April 14, 1942.  M. R. HUTCHISON, JR  2,279,401
SCREW STICK WITH STOP
Filed June 21, 1941

Miller R. Hutchison, Jr.
INVENTOR

BY
ATTORNEYS

Patented Apr. 14, 1942

2,279,401

UNITED STATES PATENT OFFICE 2,279,401

SCREW STICK WITH STOP

Miller R. Hutchison, Jr., Rochester, N. Y., assignor to Eastman Kodak Company, Rochester, N. Y., a corporation of New Jersey Application June 21, 1941, Serial No. 399,120

5 Claims. (Cl. 85—41)

This invention relates to an improved form of screw stick by the use of which the application of screws to work is expedited. One object of my invention is to provide a screw stick which can be used as a unit for loading into a special type of screw driver and which can be driven one screw at a time into work by turning the driven screw solely through a narrow frangible neck which may be twisted off when the driven screw is properly seated. Another object of my invention is to provide a screw stick which will automatically notify the operator when the useful screws of the stick have been used up. Still another object of my invention is to provide a screw stick which will automatically prevent an operator from dropping the last screw from the screw driver and possibly into work from which it might be difficult to remove the unused screw. Still other objects will appear from the following specification, the novel features being particularly pointed out in the claims at the end thereof.

Coming now to the drawing wherein like reference characters denote like parts throughout:

Figure 1:
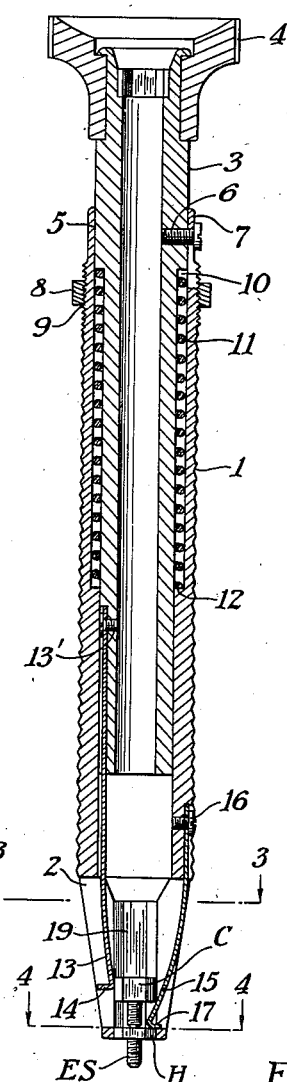
Fig. 1 is a longitudinal section through a typical screw driver with a portion of a screw stick in place, the screw stick illustrating an improved embodiment of my invention.

In my copending application, Serial No. 306,505 for a Screw driver for screw sticks, filed November 28, 1939, I have illustrated a screw driver of the type which is shown in the present drawing as being suitable for driving my improved type of screws formed into a screw stick.

In my copending application, Serial No. 306,504, filed November 28, 1939, I have described and shown a screw stick over which the present form of screw stick is an improvement.

The present invention consists broadly in providing a screw stick with a configuration at the end of the screw stick which will accomplish two functions. First, it will permit an operator driving screws from the screw stick to "feel" when the end of a screw stick approaches the end of the screw driver since the screw advancing mechanism will be unable to advance the last screw. Second, it will prevent the screw driver from accidentally dropping the last screw of a stick into work.

Since the individual screws of the screw stick are each turned into work by means of a torque applied to a screw adjacent the driven screw applied solely through a narrow neck, it is obvious that if all the screws of a screw stick are automatically advanced after the last screw is advanced there will be no way of driving such a screw, and consequently, this screw would be wasted. In addition, the screw would drop from the end of the screw driver because it could no longer be held in driving relationship to the screw driver. Often this would not make any difference but in some instances, as where fine mechanisms such as shutter mechanisms are being assembled, if a screw is dropped into the mechanism it may be a long and expensive job to disassemble the parts to remove the unused screw.

In order to overcome the above objections, I have provided an end screw which is unfinished or which has a different contour from the rest of the screws of the stick so that when this last screw comes opposite the screw driver advancing mechanism, since the screw cannot be advanced, the operator's attention will be called to the fact that a refill is necessary and the unused screw may be shoved out of the screw driver by the use of a fresh screw stick being loaded into the screw driver.

The screw driver may consist of a hollow handle 1 having a screw driving end 2 and a screw advancing member 3 which preferably includes the usual type of rotatable handle or knob 4 which is, however, hollow. The screw advancing member 3 can slide in an upper hollow end 5 of the handle 1, its movement being limited by means of a screw 6 which passes through a slot 7 the effective length of which can be altered by means of collar 8 threaded at 9 to the handle 1. Thus, by moving the collar back and forth the extent of movement of the screw advancing member 3 can be controlled to an extent suitable to care for screws of varying lengths.

The screw advancing member 3 is provided with a shoulder 10 against which one end of a spring 11 rests, the other end of the spring resting against a shoulder 12 in the bore 5 of the handle. Thus, the screw advancing end 3 is normally held in the raised position shown in Fig. 1 so that an advancing spring 13 connected by a screw 13' to the tubular advancing member 3 can lie in the Fig. 1 position with a flange 14 resting against a screw head. If this screw head is of a normal type shown in Fig. 5, the spring will lie inwardly and engage the top of the screw head for advancing the screw stick. However, if the screw head is of a different configuration C as shown since the flange 14 cannot move far enough upwardly to snap over the top of the screw stick it cannot be advanced. Therefore, the operator immediately recognizes that a fresh screw stick must be inserted and when this is done the remaining portion of a screw stick with the screw configuration C is manually thrust from the end of a screw driver.

A holding spring 15 may be attached to the handle 1 by means of a screw 16, this holding spring having a shoulder 17 adapted to rest against the head H of an end screw ES. The end screw is, of course, the screw being applied to the work.

Figure 3:
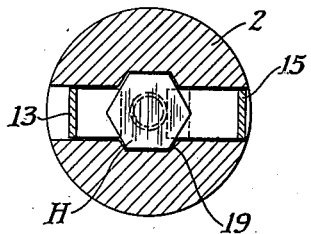
Fig. 3 is an enlarged sectional view on line 3—3 of Fig. 1.

As fully explained in my two copending above-mentioned applications, the screw driver 1 has a section 19 which is more or less complementary in shape to the screw head H since it fits the head sufficiently tightly to form a driving connection therewith. This section extends above the extreme end of the screw driver 2 and may be as shown in Fig. 3.

Figure 4:
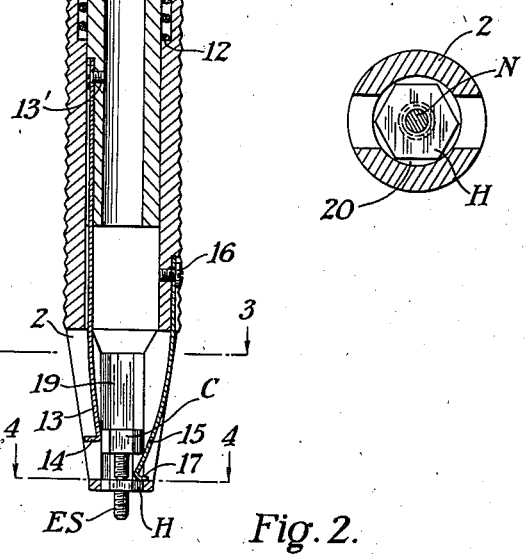
Fig. 4 is an enlarged sectional view on line 4—4 of Fig. 1.
Figure 2:
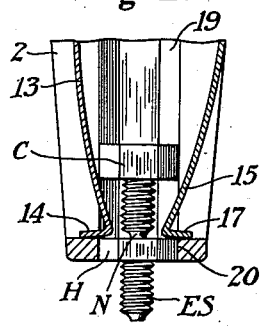
Fig. 2 is an enlarged fragmentary view of the end of a screw stick in operative relationship with the end of a screw driver.

Fig. 4 shows that the extreme end of the screw driver is preferably provided with an opening 20 which is of such size that the screw head H may be supported but may nevertheless turn relative to the screw driver. Thus, when one screw head H which is the screw head of the end screw lies in the round opening 2 it may be driven into work by one or more screw heads H fitting into the configuration 19. By turning the screw driver, the narrow neck N between the driving screw and the driven screw may be twisted off when the threaded area T of a screw has been properly seated in the work.

Figure 5:
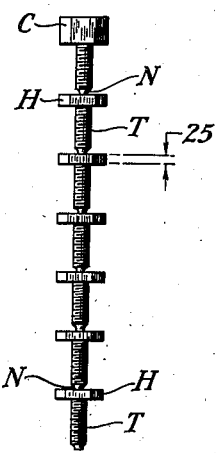
Fig. 5 is a fragmentary perspective view of a screw stick illustrating one embodiment of my invention.
Figure 6:
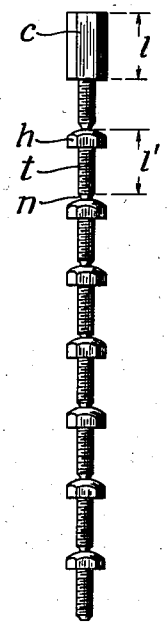
Fig. 6 is a side elevation of a screw stick illustrating a slightly different embodiment of my invention.

My improved screw stick may take a number of forms, two of the preferred forms of which are shown in Figs. 5 and 6. From Fig. 5 it will be noticed that the screw stick is composed of a series of identical screws, each of which includes a threaded area T, a head H and a narrow neck N connecting the threaded area of one screw to the head of the next adjacent screw. All of the screws of the screw stick are identical with the exception of the top screw which is provided with a configuration C which may be unfinished and which is somewhat thicker than the thickness 25 of the heads H of the remaining screws. The reason for this, as above explained, is that since the advancing spring 13 cannot snap behind the top of the configuration C because it is not permitted to travel far enough, it will be unable to advance the last screw and thus notify the operator that the screw driver needs refilling as well as prevent premature dropping of the last screw.

In Fig. 6 the screw stick is similar to that of Fig. 5 except that the configuration $c$ is of substantially the same length 1 as the length 1' of a screw. As before, each screw consists of a head $h$, a thread area $t$ and a narrow neck $n$ connecting the head of one screw to the threaded area of the next adjacent screw.

In both of the forms of screw stick shown in Figs. 5 and 6, the configurations C and $c$ are each of greater thickness than the normal thickness of the screw head H and $h$ so that they cannot be engaged by the advancing spring. The outside contours of these configurations C and $c$ are preferably of approximately the cross section of the cross section of the screw heads. I find it convenient to form screw sticks out of standard non-round rod stock and when using such stock the contour of the configurations C or $c$ is always that of the screw heads H or $h$ although this, of course, is not essential.

With any form of screw head it is only necessary to provide the uppermost screw with a configuration which will slide inside of the screw driver and which is of such length that it cannot be advanced by the advancing spring 13 to accomplish the desired end. In Figs. 5 and 6, I have illustrated the two embodiments as including only a few screws. For hand screw drivers, as illustrated in Fig. 1 utilizing small screws of an overall length of say about one-eighth of an inch, I find it convenient to provide screw sticks having 25 to 30 screws in one unit. However, any desired number can, of course, be made and I have produced screw sticks with over 350 screws in one integral piece.

I claim:

1. A screw stick for use as a unit in applying an end screw of the screw stick to work by a force applied to another screw of the stick and comprising a plurality of integrally connected coaxially arranged screws of uniform dimensions, each screw including a torsional driving head, a threaded portion, and a relatively narrow neck connecting the threaded portion of one screw to the next adjacent screw head, the relatively narrow neck portion being so proportioned relative to the threaded portion of the screw that the neck portion may be broken by driving torsion when said end screw is properly seated in work, and an unformed end on the screw stick of a length considerably greater than the thickness of a screw head.

2. A screw stick for use as a unit in applying an end screw of the screw stick to work by a force applied to another screw of the stick and comprising a plurality of integrally connected coaxially arranged screws of uniform dimensions, each screw including a torsional driving head, a threaded portion, and a relatively narrow neck connecting the threaded portion of one screw to the next adjacent screw head, the relatively narrow neck portion being so proportioned relative to the threaded portion of the screw that the neck portion may be broken by driving torsion when said end screw is properly seated in work, and an unformed end on the screw stick of a length considerably greater than the thickness of a screw head and having an outside contour substantially the same as the outside contour of a screw head.

3. A screw stick for use as a unit in applying an end screw of the screw stick to work by a force applied to another screw of the stick and comprising a plurality of integrally connected coaxially arranged screws, each screw including a torsional driving head, a threaded portion of uniform length, and a relatively narrow neck connecting the threaded portion of one screw to the next adjacent screw head, the neck portion being so proportioned relative to the threaded portion of the screw that the neck portion may be broken by driving torsion when said end screw is properly seated in work, the head of the last screw of the screw stick being materially thicker than the heads of any of the other screws of the screw stick.

4. A screw stick for use as a unit in applying an end screw of the screw stick to work by a force applied to another screw of the stick and comprising a plurality of integrally connected coaxially arranged screws, each screw including a torsional driving head, a threaded portion of uniform length, and a relatively narrow neck connecting the threaded portion of one screw to the next adjacent screw head, the neck portion being so proportioned relative to the threaded portion of the screw that the neck portion may be broken by driving torsion when said end screw is properly seated in work, the heads of all screws being of the same thickness with the exception of the head of the last screw of the screw stick, the head of the last screw including a thickness materially greater than that of the other screw heads.

5. A screw stick for use as a unit in applying an end screw of the screw stick to work by a force applied to another screw of the stick and comprising a plurality of integrally connected coaxially arranged screws, each screw including a torsional driving head, a threaded portion of uniform length, and a relatively narrow neck connecting the threaded portion of one screw to the next adjacent screw head, the neck portion being so proportioned relative to the threaded portion of the screw that the neck portion may be broken by driving torsion when said end screw is properly seated in work, the head of the last screw of the screw stick being substantially as long as the total length of an individual screw of the screw stick.

MILLER R. HUTCHISON, JR.